H. K. PORTER.
Top-Prop for Carriages.

No. 222,531.        Patented Dec. 9, 1879.

Witnesses:
Samuel D. Kelley
Freeman C. Goodnow

Inventor:
Henry K. Porter.
By Porter & Hutchinson
Attys

UNITED STATES PATENT OFFICE.

HENRY K. PORTER, OF BOSTON, MASSACHUSETTS.

IMPROVEMENT IN TOP-PROPS FOR CARRIAGES.

Specification forming part of Letters Patent No. 222,531, dated December 9, 1879; application filed May 31, 1878.

*To all whom it may concern:*

Be it known that I, HENRY K. PORTER, of Boston, State of Massachusetts, have invented Improvements in Carriage-Top Irons, of which the following is a specification.

This invention relates to the top-props which are secured to the bows of a turn-down top-carriage, and upon which the top joints are pivoted; and the invention consists in forming the props with a bow-plate having a socket with a square cross-section both internally and externally, and a stud or start having a square tenon to fit such socket, and being secured therein by a draft-pin which passes through the walls of such socket and through the tenon, such stud being shouldered upon the socket, and having an outer shoulder against which an interior shoulder of the collar is forced by the action of the nut which screws the joint upon the stud, all as will be fully described.

Figure 1:
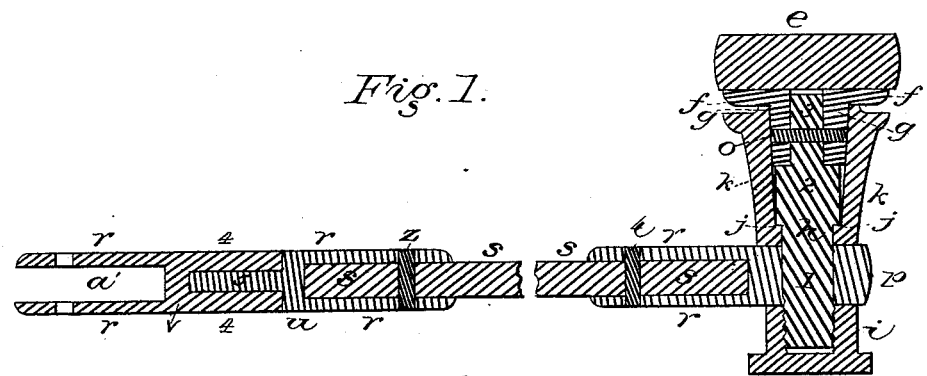
Figure 3:
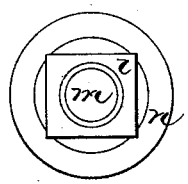
Figure 2:
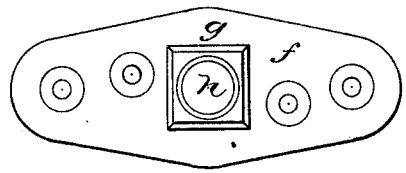
Figure 4:
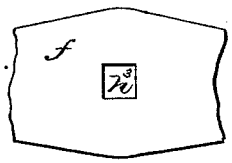

Figure 1 is a horizontal section, showing both the joint and stud in longitudinal section. Fig. 2 is a front view of the bow-plate, showing the stud or prop inserted therein. Fig. 3 is a plan view of the base or inner end of the collar. Fig. 4 is an under or back side view of the bow-plate, showing the stud inserted in the socket.

In these views, $e$ represents a cross-section of one of the bows. $f$ is the bow-plate. $g$ is the square boss formed thereon. $h$ is the stud or prop, which embraces its members 1 2 3, 3 being the square tenon inserted in boss $g$, and which is secured therein by the pin $o$, which passes through the boss and stud, as shown in Fig. 1. 2 is the enlarged portion, which shoulders against boss $g$ and affords a bearing for the interior shoulder of collar $k$, as shown in Fig. 1 at $j$, 1 being the outer round portion on which the eye $p$ of the joint is secured, and on which it vibrates as the top is opened or closed. $i$ is the prop-nut which secures the joint in place. In Fig. 3, $l$ is the square portion of the hole in collar $k$, which fits on boss $g$. $m$ is the round hole which receives the round portion of the stud, and $n$ is the flange of the collar.

The stud $h$ may be round in its entire length, or it may be all square except where eye $p$ and nut $i$ are fitted to it; but for convenience I prefer it as shown.

I claim as my invention—

1. A top-prop embodying the bow-plate $f$, with its hollow boss $g$, the stud $h$, fitted to such boss and secured therein by pin $o$, and the inclosing-sleeve $k$, all substantially as described and shown.

2. In a top-prop, the bow-plate $f$, with the boss $g$, having a square hole therein, and the stud $h$, with its square portion 3 fitting in such hole and secured by pin $o$, substantially as specified.

3. In a top-prop, the bow-plate $f$, having a boss formed with a square exterior and a square hole, the stud $h$, with the member 3 fitting such hole, and the enlarged square member 2, and collar $k$, with an interior shape, fitting such boss and member 2 of the stud, substantially as specified.

4. In a top-prop, the combination of bow-plate $f$, having the boss $g$, with a square exterior and interior, the square stud $h$ fitting therein, and the sleeve $k$, with an interior fitting to such boss and stud, substantially as specified.

HENRY K. PORTER.

Witnesses:
T. W. PORTER,
EUGENE HUMPHREY.